(12) United States Patent
Weinmann et al.

(10) Patent No.: US 11,163,054 B2
(45) Date of Patent: Nov. 2, 2021

(54) RADAR RADIATION REDIRECTING TAPE

(71) Applicant: 3M INNOVATIVE PROPERTIES COMPANY, St. Paul, MN (US)

(72) Inventors: Christian Weinmann, Alsdorf (DE); Markus G. W. Lierse, Moenchengladbach (DE); Benjamin Muenstermann, Duisburg (DE); Ronald D. Jesme, Plymouth, MN (US); Volker Korsten, Moenchengladbach (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/321,376

(22) PCT Filed: Jul. 27, 2017

(86) PCT No.: PCT/US2017/044083
§ 371 (c)(1),
(2) Date: Jan. 28, 2019

(87) PCT Pub. No.: WO2018/022834
PCT Pub. Date: Feb. 1, 2018

(65) Prior Publication Data
US 2019/0162839 A1 May 30, 2019

(30) Foreign Application Priority Data

Jul. 29, 2016 (EP) ..................................... 16182004

(51) Int. Cl.
*G01S 13/75* (2006.01)
*H01Q 1/32* (2006.01)
(Continued)

(52) U.S. Cl.
CPC .......... *G01S 13/753* (2013.01); *H01Q 1/3233* (2013.01); *H01Q 15/145* (2013.01); *H01Q 19/30* (2013.01); *G01S 2013/9329* (2020.01)

(58) Field of Classification Search
CPC .......... G01S 13/753; G01S 2013/9329; H01Q 1/3233; H01Q 15/145; H01Q 19/30
(Continued)

(56) References Cited

U.S. PATENT DOCUMENTS

RE24,413 E * 1/1958 Weiss ....................... H01Q 5/49
343/803
4,925,335 A * 5/1990 Eigenmann ...... G08G 1/096716
404/12
(Continued)

FOREIGN PATENT DOCUMENTS

DE 102009021851 12/2009
DE 102010032063 5/2011
(Continued)

OTHER PUBLICATIONS

Balanis, "Antenna Theory: Analysis and Design", Ed.04, Table of contents, 6 pages.
(Continued)

*Primary Examiner* — Bo Fan
(74) *Attorney, Agent, or Firm* — Carlos M. Téllez Rodríguez; 3M Innovative Properties Company (57) ABSTRACT

Radar radiation redirecting tapes (1, 2) include a first plurality of individual radar-reflecting directional antennae (5, 11). Each directional antenna comprises at least three elongate, unevenly spaced antenna conductors (10, 20, 30), arranged with their long extensions parallel to each other in the plane of the tape, such that the directional antenna is operable to reflect incoming radar radiation predominantly in a direction (80) which is orthogonal to the long extension
(Continued)

of the antenna conductors and parallel to the plane of the tape.

17 Claims, 4 Drawing Sheets

(51) Int. Cl.
 *H01Q 15/14* (2006.01)
 *H01Q 19/30* (2006.01)
 *G01S 13/931* (2020.01)
(58) Field of Classification Search
 USPC .............................................. 342/70, 82, 89
 See application file for complete search history.

(56) References Cited

U.S. PATENT DOCUMENTS

| 6,005,511 | A | 12/1999 | Young | |
|---|---|---|---|---|
| 6,882,300 | B2* | 4/2005 | Nakamura | H01Q 1/3225 |
| | | | | 342/5 |
| 2003/0160730 | A1* | 8/2003 | Alsliety | H01Q 1/38 |
| | | | | 343/818 |

FOREIGN PATENT DOCUMENTS

| EP | 0135740 | 4/1985 |
|---|---|---|
| EP | 1 331 838 | 9/2008 |
| JP | 60-076000 | 4/1985 |
| JP | 2009-207078 | 9/2009 |
| JP | 2011-019021 | 1/2011 |
| KR | 10-1390251 | 5/2014 |
| WO | WO 2014-082821 | 6/2014 |
| WO | WO 2015-034828 | 3/2015 |

OTHER PUBLICATIONS

Stutzman, "Antenna Theory and Design", Jun. 2012, Ed.03, Table of contents, 20 pages.
Hallbjorner, "Improvement in 77-GHz Radar Cross Section of Road Work Jacket and Side Screen by Use of Planar Flexible Retrodirective Reflectors", IEEE Antennas and wireless propagation letters, vol. 12, pp. 1085-1088.
International Search report for PCT International Application No. PCT/US2017/044083 dated Nov. 6, 2017, 6 pages.

* cited by examiner

RADAR RADIATION REDIRECTING TAPE

CROSS REFERENCE TO RELATED APPLICATIONS

This application is a national stage filing under 35 U.S.C. 371 of PCT/US2017/044083, filed Jul. 27, 2017, which claims the benefit of European Application No. 16182004.8, filed Jul. 29, 2016, the disclosure of both applications is incorporated by reference in their entirety herein.

FIELD

The disclosure relates to tapes that redirect radar radiation in a preferred direction, as may be used on roads to assist in driving or to facilitate autonomous driving.

SUMMARY

Briefly, in one aspect, the present disclosure provides a radar redirecting tape arrangeable such as to define a plane. The tape comprising a first plurality of individual radar-reflecting directional antennae wherein each directional antenna comprises at least three elongate, unevenly spaced antenna conductors arranged with their long extensions parallel to each other in the plane of the tape, such that the directional antenna is operable to redirect incoming radar radiation predominantly in a direction which is orthogonal to the long extension of the antenna conductors and parallel to the plane of the tape.

In some embodiments, the at least three elongate, unevenly spaced antenna conductors comprise a dipole, a reflector and a first director), wherein the dipole is arranged between and adjacent to the reflector and the first director.

In some embodiments, the dipole has a length of between 0.15 millimeters and 15 centimeters, e.g., between 0.2 millimeters and 20 millimeters. In some embodiments, the first director is spaced from the dipole by a distance (d13) of between 10 and 30% of the length of the dipole. In some embodiments, the reflector is spaced from the dipole by a distance (d12) of between 20 and 40% of the length of the dipole. In some embodiments, the difference between the distance d13 and the distance d12 is between 5% and 30% of the length of the dipole.

In some embodiments, the length of the first director is at least 10% shorter than the length of the dipole, e.g., 10 to 30% shorter than the length of the dipole. In some embodiments, the length of the reflector is at least 2% longer than the length of the dipole, e.g., between 2 and 8% greater than the length of the dipole (30), or between 8 and 40% greater than the length of the dipole (30).

In some embodiments, the tape has a relative permittivity ($\varepsilon_R$) and a design radar frequency (F). In some embodiments, F is between 10 and 200 GHz and $\varepsilon_R$ is greater than 1 and less than 10, resulting in an effective wavelength ($\lambda'$) of $c/(F\sqrt{\varepsilon_R})$, where c is the speed of light in a vacuum. In some embodiments, the length of the dipole is between 40 and 60% of the effective wavelength; the length of the first director is between 15 and 25% shorter than the length of the dipole; the distance between the dipole and the first director (d13) is between 15 and 25% of the length of the dipole; the length of the reflector is between 2 and 30% longer than the length of the dipole; the distance between the reflector and the dipole (d12) is between 25 and 35% of the length of the dipole; and the difference between d12 and d13 is between 5% and 30% of the length of the dipole.

In some embodiments, the at least three elongate, unevenly spaced antenna conductors, arranged with their long extensions parallel to each other in the plane of the tape, are arranged and adapted such that they form a Yagi-type antenna structure.

In some embodiments, the tape according to any one of the preceding claims, wherein the tape is elongate and defines, in the plane of the tape, a length direction and a width direction orthogonal thereto, and wherein the antenna conductors of the first plurality of antennae are arranged, in the plane of the tape, such that their long extensions are orthogonal to the length direction of the tape. In some embodiments, the tape according to any one of the preceding claims, wherein at least one of the antenna conductors of the first plurality of antennae is formed by a coated pattern of conductive material. In some embodiments, the tape further comprises a carrier supporting one or more of the antenna conductors of the first plurality of antennae.

In some embodiments, all antennae of the first plurality of individual radar-reflecting directional antennae have the same geometric orientation in the plane of the tape, for providing a first common predominant reflection direction of the first plurality of individual radar-reflecting directional antennae.

In some embodiments, the tape further comprises a second plurality of individual radar-reflecting directional antennae, wherein each directional antenna of the second plurality of antennae comprises at least three elongate, unevenly spaced antenna conductors, arranged with their long extensions parallel to each other in the plane of the tape. In some embodiments, all antennae of the second plurality of individual radar-reflecting directional antennae have the same geometric orientation in the plane of the tape, for providing a second common predominant reflection direction of the second plurality of individual radar-reflecting directional antennae, wherein the angle between the first common predominant reflection direction and the second common predominant reflection direction is between 1 and 180 degrees. In some embodiments, the antenna conductors of the antennae of the first and of the second plurality of antennae are formed on the same carrier.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Indicators like traditional road marking and traffic signs have been in use to assist human drivers in driving a vehicle safely on roads. These indicators are designed to be visible to the human eye. More recently, some cars have been equipped with driver assistance systems based on optical cameras which image traditional road marking and traffic signs. However, visible camera detection of such elements may be impaired by rain, fog, dust, snow or other adverse weather conditions. Lately, other sensor systems like infrared cameras, ultrasonic parking assistants or radar systems have come up that make use of indicators which can be detected through rain, fog or dust. These are mostly invisible to the human eye.

In particular, radar systems have been proposed to assist a human driver in keeping in a lane, in keeping autonomous road vehicles in a lane of a road or in determining the position of the vehicle in the direction of the road. Most such radars operate at frequencies of about 1 GHz to 300 GHz. Long-range vehicle guidance radar systems often use a radar frequency of about 77 GHz for distances of up to 200-300 meters, while short-range vehicle guidance radar mostly operates at about 24 GHz for distances of up to 40 meters. Such systems require radar-visible, i.e. radar-reflecting indicators on the road or next to the road in order to be useful for steering a vehicle.

Such indicators can be accommodated in road marking strips, which delineate the road visibly. The European patent application EP 0,135,740 A2, for example, relates to a road marking strip and passive components beneath the strip which are designed for returning radar energy to receiving components on board the vehicle.

The U.S. Pat. No. 6,005,511 relates to a radar guidance apparatus, in which pulses are reflected back to the vehicle by a stripe distributed along the roadway. The stripe is explained to be a frequency-selective surface which generates retro-reflective grating lobes at an operating frequency of the tracking radar.

Traditional radar-reflecting stripes generally have a somewhat complex structure and are therefore costly to manufacture. Also, many of them are not optimized for grazing incidence and reflection that is typical of vehicle guidance geometries, where the radar emitter is typically installed less than one meter above ground and reflected radar signals originate from elements at distances of typically tens of meters or a few hundred meters.

In the light of the prior art it appears desirable to provide a tape which has an improved ability to redirect radar in a vehicle guidance geometry, and which can be manufactured in a cost-effective way. The present disclosure attempts to address these problems.

The present disclosure provides a radar redirecting tape, arrangeable such as to define a plane. The tape comprises a first plurality of individual radar-reflecting directional antennae. Each directional antenna comprises at least three elongate, unevenly spaced antenna conductors, arranged with their long extensions parallel to each other in the plane of the tape, such that the directional antenna is operable to redirect incoming radar radiation predominantly in a direction which is orthogonal to the long extension of the antenna conductors and parallel to the plane of the tape.

The predominant redirection of radar radiation into a direction parallel to the plane of the tape to provide a high radar intensity in typical vehicle guidance geometries, where a radar beam is emitted from a vehicle, hits the radar redirecting tape tens of meters away from the vehicle at a shallow angle, and is redirected back to the vehicle. Although the radar radiation is redirected predominantly in a direction parallel to the tape, the direction towards the vehicle is very close to directions parallel to the tape. The angle between these two directions is typically less than 1.5°. However, intensity lobes of the radar-reflecting directional antennae of the present disclosure are mostly much wider than 1.5°. For that reason, while the maximum intensity is redirected parallel to the tape, a large fraction of radiation is redirected towards the vehicle. In other words, the vehicle is within the main intensity lobe of a directional antenna, although not necessarily in its central direction. A certain amount of radiation is lost by being reflected in other directions, e.g. in directions other than towards the vehicle. By virtue of the directional antennae, radar radiation incident on the tape at shallow angles, i.e. at grazing incidence, can be redirected strongly back towards the radar emitter.

Radar frequencies are electromagnetic radiation frequencies of between about 1 GHz and about 300 GHz. A radar frequency may be, for example, a frequency of about 77 GHz or of about 24 GHz. Radar wavelengths are wavelengths corresponding to these radar frequencies. At a radar frequency, a radar wavelength within a tape material may be different from the radar wavelength in vacuum. Radar wavelengths within a material are meant to denote effective wavelengths, i.e. corrected for the dielectric properties like, for example, the relative permittivity $\varepsilon_R$ of the material. Generally, in a medium having relative permittivity $\varepsilon_R$ and relative magnetic permeability $\mu_R=1$, the effective wavelength is $\lambda'=c/(F\sqrt{\varepsilon_R})$, with c being the speed of light in a vacuum (3.00E+08 meters/second) and F being the radar frequency in vacuum. A radar frequency of 77 GHz corresponds to a radar wavelength of 3.9 mm in vacuum, and to an effective wavelength of 2.8 mm in a medium having $\varepsilon_R=2$. A radar frequency of 24 GHz corresponds to a wavelength of 12.5 mm in vacuum, and to a wavelength of 6.3 mm in a medium having $\varepsilon_R=4$.

Polymeric materials are suitable material for embedding in them antennae of a tape according to the present disclosure. Relative permittivity of many polymeric materials is in the range of greater than 1 to 10, e.g., greater than 1 to 8, greater than 1 to 6, or even 2 to 4. Values of relative permittivity for a specific material can be obtained from numerous existing tables. Relative permittivity is known to be a function of frequency. Therefore, standard equipment and methods may be used to measure relative permittivity for the intended use conditions.

A radar redirecting tape according to the present disclosure will normally be designed for a specific radar frequency, the "design radar frequency", with which the tape is supposed to be used. The distance between parallel antenna conductors of a directional antenna will be selected according to the effective wavelength of the design radar frequency. Also the length of antenna conductors of a directional antenna will be selected according to the effective wavelength of the design radar frequency. Other parameters, like for example the distance between adjacent antennae, may be selected such that one antenna does not interfere with the performance of an adjacent antenna. Hence the geometry of the antenna conductors, their spacing, size, arrangement etc. will normally depend on the design radar frequency.

A radar redirecting tape according to the present disclosure will normally be designed for a specific radar intensity, the "design radar intensity". For a given design radar intensity, the intensity of the radar radiation reflected by the tape towards the vehicle can normally be increased by having more directional antennae of the same orientation per unit area of the tape.

A radar redirecting tape according to the present disclosure may be flexible. The tape may thus be bent. This allows the tape to be provided in rolls. The tape can be flattened, i.e. brought into a flat shape, or in other words, the tape may be arrangeable such as to define a plane. Since tapes are generally thin, a flattened tape defines a plane, which may also be called the plane of the tape.

A tape according to the present disclosure may be conformable. That is to say, it may be adapted to follow contours of a surface when being pressed against the surface. A conformable tape is easier to apply over surface features of the road surface. Conformable adhesive tapes may provide a greater contact surface between adhesive and the road surface, so that they adhere to the road surface more reliably.

Generally, and independent of other features described herein, a radar redirecting tape according to the present disclosure may be an adhesive tape or a self-adhesive tape. An adhesive tape comprises an adhesive layer, like for example a layer of hotmelt adhesive or of pressure-sensitive adhesive, by which the tape can be attached to a surface of a road or to other surfaces, either permanently or temporarily. Tapes for temporary attachment to a road surface may be removable from the road surface. A self-adhesive tape comprises a layer of a pressure-sensitive adhesive for attachment to a road surface or to another surface.

Alternatively, the tape according to the present disclosure may be adhesive-free. Such adhesive-free tapes may be attached to surfaces via separate adhesive elements, not comprised in the tape, or by non-adhesive means. A tape which is adhesive-free initially may be provided with adhesive at a later stage, e.g. shortly before attachment to a surface. Adhesive-free tapes may thus provide enhanced versatility in manufacturing and/or in application.

The size of the directional antennae depends, inter alia, on the design radar frequency and on the relative permittivity of the material in which their antenna conductors are embedded. If the antennae are smaller, more of them can be accommodated on each square centimeter of the tape. A tape according to the present disclosure, having a relative permittivity of $\varepsilon_R=2$, that is designed for a radar frequency of 77 GHz, may comprise, per square centimeter of the tape, between one and one hundred or two hundred directional antennae.

As used in this disclosure, the term "directional antenna" refers to an antenna that has a maximum gain in one specific direction, compared to its gain in all other directions. For example, in an emitting antenna, a simple dipole is not considered a directional antenna, because it emits radiation evenly into all directions orthogonal to its long extension (i.e. orthogonal to its length direction), and does not emit predominantly into one preferred direction of those directions. A Yagi type antenna, however, is considered a directional antenna, because it has a maximum gain in its forward direction.

It should be noted that generally the term "antenna" often refers to structures either for picking up electromagnetic waves or for emitting electromagnetic waves. It is known, however, that directional characteristics of an antenna are identical for absorption and emission. In the context of this disclosure, "antenna" refers to a structure that picks up electromagnetic radiation and re-emits it. An antenna according to the present disclosure therefore performs the function of a directional reflector. In a tape according to the present disclosure, the directional characteristics are determined, inter alia, by the size, location, orientation and electrical properties of the antenna conductors of the directional antennae.

The individual radar-reflecting directional antennae of a tape according to the present disclosure make use of interference effects, known from antenna theory, in order to provide directional reflection. Typical distances between their antenna conductors, and certain dimensions of antenna conductors are in the order of magnitude of the incident radar radiation for which the tape is designed, i.e. in the range of fractions of a millimetre up to thirty centimeters.

An antenna conductor may be adapted, e.g. by its shape, size, conductivity, or its location or orientation relative to other antenna conductors of the antenna, for reflecting or redirecting or re-emitting or picking up incident radiation. Examples of antenna conductors are the resonant dipole, a director or a reflector in a Yagi-type antenna. An antenna conductor may consist of, or comprise, a trace or path of a conductive material on a carrier. Specifically, it may consist of, or comprise, a copper trace on a polymeric carrier. Alternatively, an antenna conductor may consist of, or comprise, a piece of wire or a metal bar. Generally, antenna conductors should be electrically highly conductive, although less conductive antenna conductors may also provide an acceptable performance.

As in a Yagi-type antenna, also antenna conductors in a radar redirecting tape according to this disclosure may be electrically connected with each other. Alternatively, they may be electrically insulated from each other. A tape where antenna conductors are electrically insulated may be more cost-effective to manufacture.

A tape according to this disclosure comprises at least three antenna conductors in each directional antenna. Suitably adapted (e.g. in length and/or conductivity) and suitably arranged, these antenna conductors provide the directional antenna with a directional characteristic. As is known from antenna theory, a directional antenna may comprise more than three antenna conductors, e.g. four, five, six or more antenna conductors. Suitably sized and arranged relative to the other antenna conductors of the directional antenna, these additional antenna conductors may enhance the directional characteristics of the antenna, e.g. by making the main intensity lobe narrower, reducing side lobes or backward reflection.

It is known from antenna theory (e.g. "Antenna Theory: Analysis and Design" by Constantine Balanis, Fourth Edition, or "Antenna Theory and Design" by Warren L. Stutzman and Gary A. Thiele, 3rd edition, June 2012) how to arrange three parallel, elongate antenna conductors of an antenna in order for the antenna to have directional characteristics. Generally, for a given radar wavelength, the spacing between the three antenna conductors is chosen such that constructive interference occurs in the desired direction of predominant reflection. The width of the main intensity lobe of an antenna can also be adjusted by selecting the spacing appropriately. The main intensity lobe can be made narrower, and side lobes can be suppressed, if a directional antenna comprises more than three antenna conductors, suitably spaced from each other.

The main intensity lobe of directional antennae in a tape according to this disclosure should not be made too narrow, e.g. not much narrower than 1.5° half-angle, because in a typical vehicle guidance geometry, the vehicle may not be within the lobe any more, and too little radar radiation may then be reflected back to the vehicle. If the lobe is too wide, reflected radar radiation is distributed over a wide range of spatial angles, and little of it is reflected towards the vehicle. In both cases, the reflected radiation will be harder to detect by the vehicle's radar receiver.

An antenna may be adapted to have particularly strong directional characteristics for a specific radar wavelength. A dimension of an antenna conductor may be adapted for use of the antenna with a specific radar wavelength. Arrangement of an antenna conductor relative to another antenna conductor, e.g. distance between an antenna conductor and another antenna conductor, of the same directional antenna may be adapted for use of the antenna with a specific radar wavelength. By such adaptations, performance or gain or directional characteristics of a directional antenna may be improved.

The at least three elongate, unevenly spaced antenna conductors may comprise a dipole, a reflector and a first director, wherein the dipole is arranged between the reflector and the first director. In other words, a first antenna conductor of the at least three antenna conductors may be operable as a dipole, a second antenna conductor of the at least three antenna conductors may be operable as a reflector, and a third antenna conductor of the at least three antenna conductors may be operable as a first director.

In this disclosure, two antenna conductors are referred to as adjacent if no other antenna conductor is arranged between them. The first antenna conductor (the dipole), may be between and adjacent to the second antenna conductor (the reflector), and the third antenna conductor (the first director). That is to say that the dipole may be arranged between the reflector and the first director, with no other antenna conductor arranged between any two of these three antenna conductors. The dipole may thus be said to be arranged between the adjacent reflector and the adjacent first director. Such an arrangement may provide for a particularly strong reflection of incoming radar radiation in a direction orthogonal to the long extension of the antenna conductors and parallel to the plane of the tape.

In the context of the present disclosure, three elongate antenna conductors, arranged with their long extensions (i.e. their length directions) parallel to each other in a plane, are unevenly spaced, i.e., the distance between the first antenna conductor and the adjacent second antenna conductor (d12) is different from the distance between the first antenna conductor and the third antenna conductor (d13). Due to manufacturing tolerances, the distances between antenna conductors will never be exactly equal.

Therefore, in this disclosure, antenna conductors are considered "unevenly spaced" if the difference between d12 and d13 is at least 5% of the length of the first conductor, e.g., in some embodiments at least 8% of the length of the first conductor. In some embodiments, the difference between d12 and d13 will be no greater than 30%, e.g., no greater than 20%, or even no greater than 15% of the length of the first conductor. In some embodiments, the difference between d12 and d13 ranges from 5 to 30%, e.g., 5 to 20%, 8 to 20%, or even 8 to 15% of the length of the first conductor.

The three elongate, unevenly spaced antenna conductors of a directional antenna may be straight. Straight antenna conductors can provide a particularly strong directional characteristic to the directional antenna. The main intensity lobe of the antenna may then be narrower, resulting in radar radiation being reflected predominantly into a narrower space, so that the reflected radar signal received at the vehicle may be stronger and easier to detect.

In some embodiments, a directional antenna may have only one straight antenna conductor, while the other two of the at least three antenna conductors may be curved. Similarly, two antenna conductors may be straight, and only one is curved. Such configurations will provide reduced directionality of the respective antenna, but they may still result in acceptable performance. Normally, a greater directionality is desired, because it may allow to reduce power when emitting radar radiation or to reduce sensitivity when detecting reflected radar radiation. However, reduced directionality may be desired in certain application scenarios or under specific circumstances, e.g. where the relative position of the vehicle and the tape varies within a large interval.

The antenna conductors are elongate and parallel to each other in the plane of the tape. Each antenna conductor may have a midpoint. The midpoint is understood to be the geometric center of an antenna conductor. The midpoints of all antenna conductors of a directional antenna may be arranged on a straight line. The straight line may be orthogonal to the antenna conductors, i.e. orthogonal to the long extension of the antenna conductors. Such arrangements provide good directional characteristics of an antenna.

As is known from antenna theory, the relative lengths of the dipole, director(s) and reflector have a favourable impact on gain and directional characteristics of the antenna. In order to function efficiently as a resonant dipole, i.e. to absorb and re-emit the radar radiation efficiently, the dipole length should be half the effective wavelength of the radar radiation for which the directional antenna is designed. Effective wavelength is the wavelength of the radar radiation in the medium in which the antenna conductors are embedded.

In some embodiments, the dipole may thus have a length of between about 0.15 millimeters (for a radar frequency of 300 GHz in a medium having a relative permittivity of $\varepsilon_R$=10) and 15 centimeters (for 1 GHz and $\varepsilon_R$=1), or, in other words, the dipole may have a length of between about 0.15 millimeters and 15 centimeters. The range of radar frequencies expected to be used in vehicle and traffic guidance is 10 to 200 GHz, e.g., 20 to 100 GHz. This leads to ranges of expected dipole lengths of about 0.2 to 20 mm, and about 0.4 to 10 mm, respectively. For example, at a radar frequency of 77 GHz in a material having $\varepsilon_R$=4, an exemplary directional antenna may have a dipole length of about 1 mm.

A dipole with a length that does not match the half wavelength will still perform, but to a lesser, yet potentially acceptable degree. Geometric constraints or other considerations may require certain dipole lengths. Hence in a tape according to some embodiments of this disclosure, the length of the dipole may be up to 10% shorter, e.g., up to 5% shorter than half the effective radar wavelength. In some embodiments, the length of the dipole may be up to 10% longer, e.g., up to 5% longer than half the effective radar wavelength.

Generally, the length of the first director should be somewhat shorter than half the effective wavelength, e.g., at least 5%, at least 10% shorter, or even at least 15% shorter in order to provide a suitable impedance adaptation. In some embodiments, the length of the first director is no greater than 30%, e.g., no greater than 25% shorter than half the effective wavelength. If its length is smaller or greater, it will still perform its function, but to a lesser, yet potentially acceptable degree. For example, the first director will perform to some degree even if its length is equal to the length of the dipole, i.e. half the effective wavelength. So in general, the length of the first director may be equal to, or less than, the length of the dipole.

In some embodiments, the long extension, i.e. the length, of the first director is advantageously about 20% shorter than the length of the dipole (i.e., about 80% of the length of the dipole). For example, in some embodiments, the length of the first director is between 10 and 30%, e.g., between 15 and 25%, or even between 18 and 22% shorter than the length of the dipole. The first director thereby provides an impedance between the impedance of the resonant dipole and the impedance of the surrounding medium, resulting in better directional characteristics and/or higher gain. In the exemplary directional antenna mentioned above, the length of the first director may be 0.78 mm.

In order to reflect radar radiation efficiently, the reflector should be longer than the dipole. Generally, its length should be between the length of the dipole, i.e. half the effective wavelength, and the full effective wavelength of the radar radiation. For many directional antennae, best performance, e.g. best directional characteristic, is obtained with the reflector being about 5% longer than the dipole, e.g., between 2 and 8%, 3 and 7% or even between 4 and 6% longer. In the exemplary antenna mentioned above, the reflector has a length of 1.02 mm.

In other antenna geometries, it has been found advantageous for the directional characteristics if the reflector is at least 8% longer, e.g., 10% or even 20% longer than the dipole. However, a reflector with a different length may still perform acceptably, albeit with a lower efficiency. Thus generally, the length of the reflector may be equal to, or greater than, the length of the dipole. In some embodiments, the length of the reflector is no greater than 40%, e.g., no greater than 30% longer than the dipole. In certain directional antennae according to the present disclosure, the dipole is arranged between the reflector and the first director. The relative distances between the conductors have an influence on the directional characteristics of the antenna. For convenience, the distance between the first conductor and the second conductor (e.g., the dipole and reflector) will be referred to as distance d12. Similarly, the distance between the first conductor and the third conductor (e.g., the dipole and director) will be referred to as distance d13.

In many antenna geometries it has been found advantageous to arrange the first director at a distance (d13) from the dipole which is about 20% (e.g., between 15 and 25%, e.g., between 18 and 22%, or even between 19 and 21%) of the dipole length. Other distances between first director and dipole will still provide some degree of performance, which may be less than optimum, yet acceptable. Accepting a wider performance variation, the first director may be spaced from the dipole by a distance of between 10% and 30% of the length of the dipole.

If the first director is spaced from the dipole by a distance of 20%, or of about 20%, of the length of the dipole, the arrangement is expected to provide a particularly high gain of the antenna, and may enhance reflection of incoming radar radiation predominantly in a direction orthogonal to the long extension of the antenna conductors and parallel to the plane of the tape. In the exemplary directional antenna for 77 GHz, the spacing of the first director from the dipole is 0.19 mm.

In many antenna geometries it has been found advantageous to arrange the reflector at a distance (d12) from the dipole which is about 30% (e.g., between 25 and 35%, between 28 and 32%, or even between 29 and 31%) of the dipole length. Other distances between reflector and dipole will still provide some degree of performance, which may be less than optimum, yet acceptable. Accepting a wider performance variation, the reflector may be spaced from the dipole by a distance of between 20% and 40% of the length of the dipole.

If the reflector is spaced from the dipole by a distance of 30%, or of about 30%, of the length of the dipole, the arrangement is expected to provide a particularly high antenna gain, and may enhance redirection of incoming radar radiation in a direction orthogonal to the long extension of the antenna conductors and parallel to the plane of the tape. In the aforementioned exemplary directional antenna for 77 GHz, the distance of the first director from the dipole is 0.29 mm.

Combining the preferred distances mentioned above may result in an antenna having particularly strong directional characteristics and high gain. Hence, the first director may be spaced from the dipole by a distance of 20%, or about 20%, of the length of the dipole, and the reflector may be spaced from the dipole by a distance of 30%, or about 30%, of the length of the dipole. This arrangement of reflector, dipole and director is expected to provide a particularly high gain of the antenna, and may enhance reflection of incoming radar radiation, predominantly in a direction orthogonal to the long extension of the antenna conductors and parallel to the plane of the tape.

In order to be "unevenly spaced," the difference between distance d12 (e.g., the distance between the dipole and first director) and distance d13 (e.g., the distance between the dipole and the reflector) must be at least 5% of the length of the dipole, e.g., in some embodiments at least 8% of the length of the dipole. In some embodiments, the difference between d12 and d13 will be no greater than 30%, e.g., no greater than 20%, or even no greater than 15% of the length of the dipole. In some embodiments, the difference between d12 and d13 ranges from 5 to 30%, e.g., 5 to 20%, 8 to 20%, or even 8 to 15% of the length of the dipole.

The directional antenna may comprise, in the plane of the tape, a fourth antenna conductor, arranged parallel to the three antenna conductors, and arranged such that the first director is located, in a parallel manner, between the dipole and the fourth antenna conductor and adjacent to these. This fourth conductor may be operable as a second director. An antenna with a second director may provide for a higher antenna gain in the predominant reflection direction and stronger directional characteristic of the antenna.

If the antenna has more than one director, its directional characteristics are generally improved, provided the further director(s) is/are suitably arranged and shaped. As the skilled person would know from antenna theory, the presence of a second director has an impact on the optimum shape and arrangement of all other antenna conductors. The arrangement and length of further directors can be adjusted to optimize one or more of directional characteristics, operating bandwidth, and antenna gain. For good directional characteristics, the second director should be shorter, e.g. about 5% shorter, than the first director. In some embodiments, the distance from the first director to the second director should be larger, e.g. about 30% larger, than the distance from the first director to the dipole.

The at least three elongate, unevenly spaced antenna conductors, arranged with their long extensions parallel to each other in the plane of the tape, may be arranged and adapted such that they form a Yagi-type antenna structure. Yagi antennae or Yagi-Uda antennae are known in antenna theory. They provide strong directional characteristics and high antenna gain in the plane of their dipole, director and reflector. Yagi-type antenna structures, as used herein, refer to antennae having a dipole, a reflector on one side of the dipole and one or more directors on the opposite side of the dipole, all elongate, straight and parallel to each other. The dipole, the reflector and the director are arranged with their center points on a straight line orthogonal to the long extension of the dipole. The dipole is electrically shorted and has a length of half the effective radar wavelength, while the director is shorter, and the reflector is longer than the dipole. Spacing between the reflector and the dipole is about 30% of the length of the dipole, spacing between the director and the dipole is about 20% of the length of the dipole. Exact geometries depend on other factors like number of directors and the desired directional characteristics and gain.

All antennae of the first plurality of individual radar-reflecting directional antennae may have the same geometric orientation in the plane of the tape, for providing a common predominant reflection direction of the first plurality of individual radar-reflecting directional antennae. The same geometric orientation corresponds to the predominant reflection directions of the individual antennae being parallel to each other. The common reflection direction may be a common predominant reflection direction, i.e. a direction, in which the plurality of antennae predominantly reflects, when compared to other potential reflection directions.

A tape as described above may further comprise a second plurality of individual radar-reflecting directional antennae, wherein each directional antenna of the second plurality of antennae comprises at least three elongate, unevenly spaced antenna conductors, arranged with their long extensions parallel to each other in the plane of the tape. These antenna conductors may be straight or curved. The second plurality of antennae may be arranged and/or oriented and/or designed for reflecting the radar radiation predominantly in a different direction, or for reflecting radar radiation at a different reflection intensity, or for reflecting radar radiation having a different effective wavelength. The tape may thereby be rendered more versatile.

All antennae of the first plurality of antennae may be oriented parallel to each other. All antennae of the second plurality may be oriented parallel to each other. All antennae of the second plurality may be oriented parallel or antiparallel to the antennae of the first plurality of antennae. They may also be oriented such as to form an angle, in the plane of the tape, with the antennae of the first plurality.

Where the tape comprises a carrier and a second plurality of antennae, the carrier may comprise a first carrier portion supporting the antenna conductors of the antennae of the first plurality of antennae, and a second carrier portion supporting the antenna conductors of the antennae of the second plurality of antennae.

The carrier may have two opposed major surface. In that case, the first plurality of antennae may be arranged on one major surface, and the second plurality of antennae may be arranged on an opposite major surface of the carrier.

The antenna conductors of the antennae of the first and of the second plurality of antennae may be formed on the same carrier. They may, for example, be formed on the same carrier tape.

The carrier may further comprise one or more gap in the plane of the tape that are free of antenna conductors. Such antennae-free gaps are arranged between portions of the tape having antennae. The antennae-free gaps and the anternnae-carrying portions may have any size, e.g., gaps of 10 centimetres, 20 centimetres, 50 centimetres, 100 centimetres, or larger, as measured in the driving direction, when the tape is attached to a road surface. The lengths of the gaps and portions may provide for alternating times of radar reflection and no radar reflection as the vehicle drives along the road. The presence of the antennae-free gaps and the anternnae-carrying portions may be used to distinguish radar redirected from the tape from stray radar signals. In some embodiments, relative lengths of the antennae-free gaps and the anternnae-carrying portions may be used to code information similar to optical bar codes. Exemplary information that may be encoded includes speed limits, the presence of an intersection, the presence of a curve or about the end of the radar guidance at a certain distance.

As described above, the radar-reflecting tape of the present disclosure may further comprise a second plurality of individual radar-reflecting directional antennae, wherein each directional antenna of the second plurality of antennae comprises at least three elongate, unevenly spaced antenna conductors, arranged with their long extensions parallel to each other in the plane of the tape. These antenna conductors may be straight. The second plurality of antennae may be arranged such that the long extensions of the antenna conductors of the second plurality of antennae are oriented at an angle, in the plane of the tape, of between 1°, or of between about 1°, and 180°, or about 180°, relative to the long extensions of the antenna conductors of the first plurality of antennae.

This second plurality of directional antennae may be operable to reflect incoming radar radiation predominantly into a second direction, different from the predominant reflection direction of the first plurality of directional antennae. The radar redirecting tape may thereby be reflective to radar radiation incident from two different directions and reflect radar radiation incident from the first direction predominantly back into that first direction, while independently and simultaneously reflecting radar radiation incident from the second direction predominantly back into that second direction. The tape may thus be usable for two driving directions of vehicles on the road. Oriented at an orientation of 180° with respect to each other, the first plurality of directional antennae may help guide vehicles driving in one direction on the road, while the second plurality may help guide vehicles driving in the opposite direction on the same road.

The radar redirecting tape according to the present disclosure may be elongate. It may be elongate when flattened out, e.g. when applied on a surface of a road. The tape may define, in the plane of the tape, a length direction and a width direction orthogonal thereto. Where the tape is elongate, a length direction is a direction in the long extension of the tape.

The antenna conductors may be arranged, in the plane of the tape, such that their long extensions are orthogonal to the length direction of the tape. This arrangement may provide for a predominant reflection of the radar radiation in a direction roughly parallel to the length direction of the tape. Since most radar-reflecting tapes for vehicle guidance are assumed to be applied with their length direction parallel to the driving direction of the vehicles, this direction of predominant reflection provides, in many scenarios, a strong reflection back to the vehicle which emitted the radar radiation.

The tape may be flexible or bendable. A flexible or bendable tape can be rolled up to form a roll of tape. The antenna conductors comprised in the tape may be flexible or bendable, thereby supporting the flexibility of the tape. Alternatively, the antenna conductors may be rigid. Rigid antenna conductors may provide better reflection characteristics to the tape.

The tape may comprise a substrate between two opposed major surfaces of the tape. The first plurality of individual radar-reflecting directional antennae may be supported by the substrate. If the tape comprises a second plurality of individual radar-reflecting directional antennae, the first plurality and/or the second plurality of individual radar-reflecting directional antennae may be supported by the substrate. The first and/or the second plurality of individual radar-reflecting directional antennae may be embedded in the substrate, i.e. arranged inside the substrate and surrounded by the substrate. Having antennae being supported by the substrate of the tape, or embedded in it, may facilitate secure bonding of the antennae to the tape. The substrate may thereby provide certain mechanical support and protection to the antennae which may result in greater longevity of the radar-reflecting tape.

Alternatively, the antennae may be arranged on a surface of the tape, e.g. on an external surface. In particular, the antennae may be arranged on a surface of the tape which is exposed after the tape has been attached to a surface of a road. In this case the reflection of incoming radar radiation may be stronger.

Known techniques can be used to make antenna conductors of antennae according to the present disclosure, like, for example, mask coating, lithography, laser ablation, or printing. One or more or all of the antenna conductors of the first plurality of antennae may be formed by a coated pattern of conductive material. One or more or all of the antenna conductors of all antennae may be formed by a coated pattern of conductive material. In a preferred embodiment, all antenna conductors are formed by a coated pattern of conductive material. A pattern may be coated directly on a surface of the substrate of the tape. It may be coated on a surface of the substrate. The tape may comprise a first major surface and an opposed second major surface, a plurality of visibly retroreflective elements on the first major surface, and an adhesive on the second major surface. In such tapes, the coated pattern may form a layer. The layer of the coated pattern may be arranged between the plurality of visibly retroreflective elements on the first major surface and the adhesive on the second major surface.

Generally, a tape according to the present disclosure may comprise a carrier, for example a carrier layer. The carrier may support one or more or all of the antenna conductors. The carrier may support all of the antenna conductors of the first plurality of antennae. Where a second plurality of antennae exists, the carrier may support all of the antenna conductors of the first plurality and of the second plurality of antennae.

The carrier may be a carrier layer. One or more or all of the antenna conductors may be formed by a pattern of conductive material coated on a carrier layer. The carrier layer may be comprised in the radar redirecting tape. In other words, the tape may further comprise a carrier layer, wherein one or more or all of the antenna conductors are formed by a pattern of conductive material coated on the carrier layer. The carrier layer may support a pattern of conductive material coated on the carrier layer, the pattern forming the antenna conductors of an antenna. The carrier layer may support a pattern of conductive material coated on the carrier layer, the pattern forming the antenna conductors of the first plurality of antennae.

When manufacturing tapes according to the present disclosure, the carrier can be provided with antenna conductors before assembling the tape. This may make the tape assembly more versatile and cost-effective.

In particular, a tape comprising a first major surface, an opposed second major surface, a plurality of visibly retroreflective elements on the first major surface, and adhesive on the second major surface, may further comprise a carrier supporting the antenna conductors. The carrier may be arranged between the plurality of visibly retroreflective elements on the first major surface, and the adhesive on the second major surface. The carrier may be a carrier layer. A carrier layer may be a carrier layer of polymeric material or comprising polymeric material.

Generally, a tape as described herein may comprise a first major surface and an opposed second major surface. The tape may comprise a plurality of visibly retroreflective elements on the first major surface. Retroreflective elements serve to improve visibility of the tape at night. The radar redirecting tape of the present disclosure may thus be used for human-visible road marking, while having radar-reflective properties.

Independent of the presence or absence of retroreflective elements, the tape may comprise an adhesive on the second major surface. The adhesive facilitates attachment of the tape to a road surface.

Concepts of the present disclosure will now be described in more detail with reference to the following Figures exemplifying particular embodiments. For greater clarity of the Figures, some dimensions or lengths are exaggerated and may be not to scale, so that certain dimensions and angles may appear larger or smaller than they are in reality.

Figure 1:
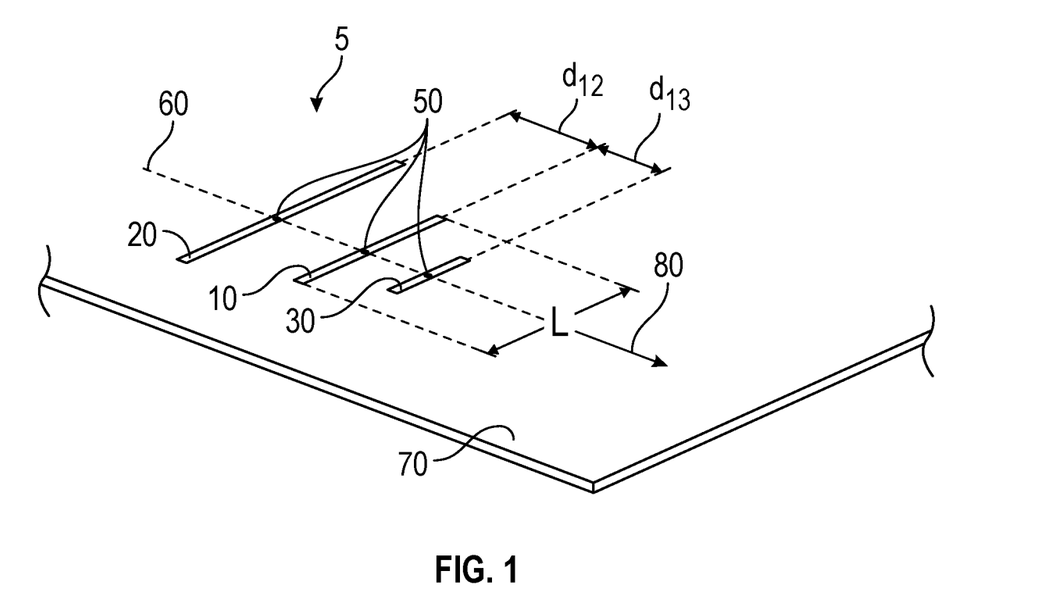
FIG. 1 Perspective sketch of a radar-reflective directional antenna for a tape according to some embodiments of the present disclosure.

FIG. 1 is a perspective view of an individual radar-reflecting directional antenna 5. The antenna 5 comprises three straight, elongate, unevenly spaced antenna conductors, namely a first antenna conductor 10, a second antenna conductor 20, and a third antenna conductor 30. They are arranged with their long extensions parallel to each other in one geometric plane. The centre points 50 of the antenna conductors 10, 20, 30 lie on a symmetry axis 60 which is orthogonal to the long extension of the antenna conductors 10, 20, 30.

The antenna conductors 10, 20, 30 are arranged unevenly spaced: the distance d12 between the first antenna conductor 10 and the second antenna conductor 20 is larger, as measured along the symmetry axis 60, than the distance d13 between the first antenna conductor 10 and the third antenna conductor 30. The distance d12 is about 30% of the length L of the first antenna conductor 10, while the distance d13 is about 20% of the length L of the first antenna conductor 10.

In this embodiment, the antenna conductors 10, 20, 30 are formed as a pattern of conductive metal, coated on a carrier 70. The carrier 70 is a thin, flexible, electrically insulating polymeric film. The antenna conductors 10, 20, 30 are very thin, so that their thickness, i.e. their extension in a direction perpendicular to the plane of the carrier 70, is not drawn.

The antenna conductors 10, 20, 30 form a directional antenna 5 for reflecting radar radiation of a desired frequency. For example, at a target frequency of about 77 GHz frequency, the vacuum wavelength is about 4 mm. In order to reflect this radiation effectively, the length L of the first antenna conductor would then be about half that wavelength, i.e. about 2 mm. Reflection characteristics of the directional antenna 5 can be adjusted to other wavelengths, e.g., the effective wavelength, by adjusting the length L.

Gain and directional characteristics can be further improved by adjusting the length, i.e. the long extension orthogonal to the symmetry axis 60, of the antenna conductors 10, 20, 30. It has been found advantageous in some applications if the third antenna conductor 30 is about 20% shorter than the first antenna conductor 10, and the first antenna conductor 20 is about 5% longer than the first antenna conductor 10.

According to known antenna theory, the spaced arrangement of the three antenna conductors 10, 20, 30 forms an antenna that reflects incoming radar radiation predominantly into the direction along the symmetry axis 60, pointing from the second antenna conductor 20 towards the third antenna conductor 30. This one direction of predominant reflection is denoted by an arrow 80. The direction of arrow 80 will also be called "reflection direction" hereinafter. According to antenna theory, an incoming radar wave is reflected from the second antenna conductor 20 and the third antenna conductor 30 such that it excites the first antenna conductor 10. Due to resonance effects, the first antenna conductor 10 re-emits the radar wave, the re-emitted wave is again reflected, with a phase shift, by the second antenna conductor 20 and the third antenna conductor 30. The re-emitted wave and the reflected waves superimpose to provide that the radar wave is reflected predominantly into the reflection direction of arrow 80, and much less into other directions. This effect makes the antenna 5 a directional reflector.

Radar waves arriving from a direction anti-parallel to direction 80 excite the first antenna conductor 10 particularly strongly, so that the re-emitted signal is generally stronger. The antenna 5 thus provides the strongest reflection signal in the reflection direction 80 when the incoming signal arrives from a direction antiparallel to reflection direction 80. It is believed that signals arriving from other directions will also be reflected predominantly in the reflection direction 80, albeit weaker.

The individual radar-reflecting directional antenna 5 resembles a known Yagi antenna or Yagi-Uda antenna. Using the terminology of Yagi-type antennae, the first antenna conductor 10 may be called a resonant dipole or dipole, the second antenna conductor 20 may be called a reflector, and the third antenna conductor 30 may be called a director or a first director, as an antenna may be equipped with further directors in order to enhance its directional characteristics. The dipole 10 is arranged between the reflector 20 and the director 30.

An individual radar-reflecting directional antenna 5 may provide different directional characteristics and gain, depending on its geometric and electric design parameters, and can thereby be designed for specific radar reflecting geometries in a vehicle guidance system.

A number of individual antennae, similar to antenna 5, can be accommodated in a radar redirecting tape. Although the antennae 5 are comparatively small, a larger number of such antennae 5, adjacent to each other and with their predominant reflection directions 80 oriented parallel, will reflect many portions of an incoming radar beam, so that the resulting overall reflected signal is stronger.

Figure 2:
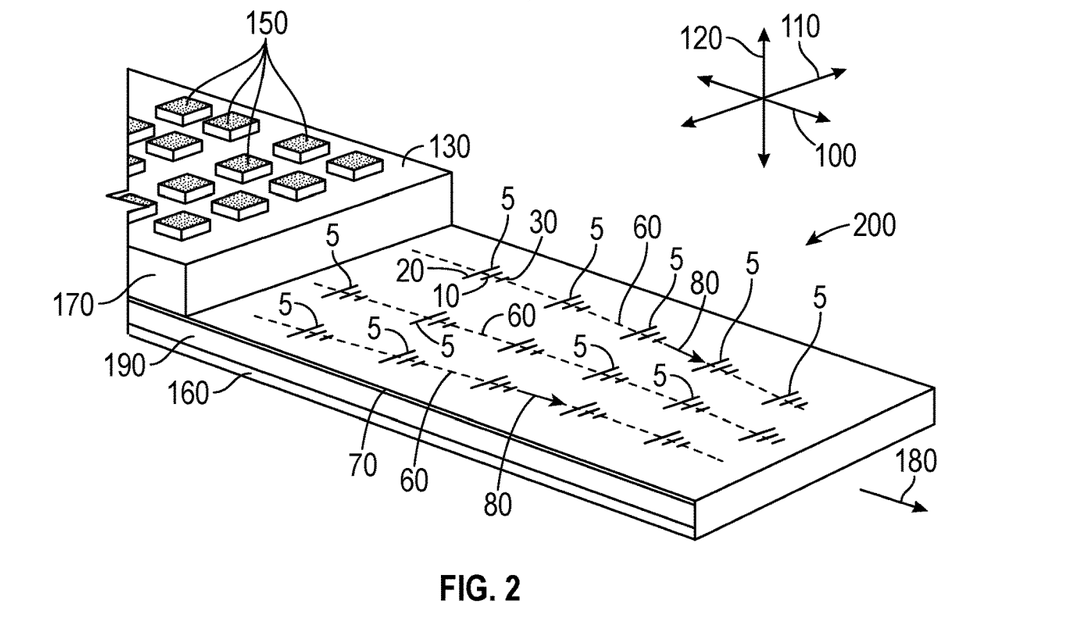
FIG. 2 Perspective sketch of a radar redirecting tape according to some embodiments of the disclosure.

FIG. 2 is a perspective sketch of a radar-reflecting tape 1 according to the present disclosure, which comprises a plurality of the individual radar-reflecting directional antennae 5 shown in FIG. 1. The tape 1 is shown with its top layer partially removed to better show the antennae 5 embedded in the body of the tape 1. Apart from the antennae 5, the tape 1 does not comprise any electrically conductive materials, in order not to affect the electrical characteristics of the antennae 5.

The tape 1 extends in length directions 100 and in width directions 110, orthogonal thereto. Thickness direction 120 is orthogonal to both of them. The tape 1 has a first major surface 130 and an opposed second major surface, which is not visible in FIG. 2. On its first surface 130, the tape 1 comprises a plurality of visibly retroreflective elements 150. These elements 150 provide visibility of the tape surface at night, when illuminated suitably, e.g. by headlights of a vehicle. The tape 1 comprises a layer of adhesive 160 on its second major surface, by which the tape 1 can be adhesively attached to a surface of a road.

The carrier 70, shown in FIG. 1, is embedded into the tape 1. The carrier 70 is arranged between an upper body layer 170 and a lower body layer 190 of the tape 1. The carrier 70 supports a large number of antennae 5, forming a plurality 200 of antennae 5. The antennae 5 are all arranged along one of three parallel symmetry axes 60 in the same geometric plane, namely the plane of the carrier 70. All antennae 5 are oriented such that their reflection directions 80 are parallel to each other. The reflection directions 80 of the individual antennae 5 thus combine to form a common reflection direction 180 of the plurality 200 of antennae 5. The antennae 5 are oriented such that the common reflection direction 180 is in the plane of the tape and parallel to the length direction 100 of the tape 1.

It is contemplated that all or some of the antennae 5 may alternatively be arranged on the upper body layer 170. They may be arranged on the upper body layer 170, below the retroreflective elements 150. The presence of retroreflective elements 150 is not essential for the radar-reflective function of the tape 1. In the absence of retroreflective elements 150, antennae 5 may be arranged on the upper surface of the upper body layer 170. The antennae 5 may then be protected against abrasion and environmental impacts by a top layer, so that they are embedded between the top layer and the upper body layer 170.

Figure 3:
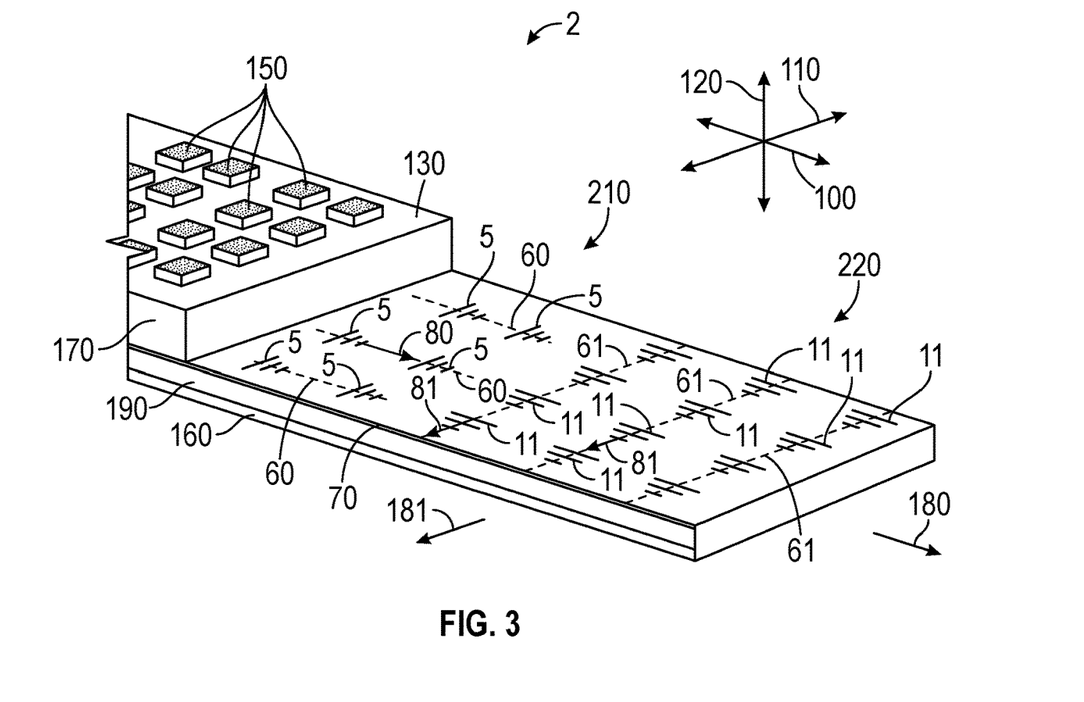
FIG. 3 Perspective sketch of a further radar redirecting tape according to some embodiments of the disclosure.

Pluralities of antennae can be oriented in different directions within the same radar-reflecting tape. This is illustrated in FIG. 3, which is a perspective view of a further radar redirecting tape according to the present disclosure, similar to the view of FIG. 2. The radar-reflecting tape 2 is a tape according to the present disclosure. It is similar to the tape 1 shown in FIG. 2, except that it comprises a first plurality, i.e. a first plurality 210, of individual radar-reflecting directional antennae 5, and a further, second plurality, i.e. a second plurality 220, of individual radar-reflecting directional antennae 11. The antennae 11 of the second plurality 220 are identical to the antennae 5 of the first plurality, i.e. of the first plurality 210, and they are arranged in the same geometric plane and on the same carrier 70. The first plurality 210 of antennae 5 is arranged on a first portion (a portion on the left-hand side, in FIG. 3) of the carrier 70, and the second plurality 220 of antennae 11 is arranged on a second portion (a portion on the right-hand side, in FIG. 3) of the carrier 70.

The antennae 11 of the second plurality 220 are all arranged along one of three parallel symmetry axes 61 in the same geometric plane, namely the plane of the carrier 70. All antennae 11 of the second plurality 220 are oriented such that their reflection directions 81 are parallel to each other. The reflection directions 81 of the individual antennae 11 thus combine to form a common reflection direction 181 of the second plurality 220 of antennae 11. The antennae 11 are oriented such that the common reflection direction 181 of the second plurality 220 is in the plane of the tape 2 and orthogonal to the common reflection direction 180 of the first plurality 210. The common reflection direction 181 is also orthogonal to length direction 100 of the tape 2.

The two pluralities 210, 220 of antennae 5, 11 provide for the tape 2 having two predominant reflection directions, which are orthogonal to each other, namely the reflection direction 180 of the first plurality 210, and the reflection direction 181 of the second plurality 220. In some embodiments, other arrangements of the two predominant reflection directions are possible. Generally, the angle between the two predominant reflection directions may range from 1 to 180 degrees. In some embodiments additional pluralities of individual radar-reflecting directional antennae, each with its own, independently selected predominant reflection direction.

In the embodiment shown in FIG. 3, the individual antennae 5, 11 of the pluralities 210, 220 are identical, i.e. the arrangement and properties of their antenna conductors 10, 20, 30 are identical. However, it is contemplated that they could be different, so that the antennae 5 of the first plurality 210 have different directional characteristics or gain than the antennae 11 of the second plurality 220. They might, for example, be designed to have a narrower lobe of predominant reflectivity. Also, the density of antennae 5, 11 per unit area of the carrier 70 may be varied from one plurality 210, 220 to another. It is noted that it is not essential that the position of the antennae 5, 11 within one plurality 200, 210, 220 be aligned along symmetry axes: their spatial distribution across the carrier 70 may be varied, and may even be random, as long as they have a common orientation, i.e. their reflection directions 80, 81 are parallel.

Generally, and independent of any specific embodiment, it is not essential that antennae 5, 11 of the various pluralities 200, 210, 220 be spatially separated. Positions of antennae 5, 11 with different reflection directions 80, 81 can be mixed on a carrier 70. For manufacturing efficiency, it may be desirable to provide two or even more separate carriers 70, so that one carrier 70 supports antennae 5, 11 oriented in one direction, and another carrier 70 supports antennae 5, 11 oriented in another direction, relative to the length direction 100 of the tape 1, 2. The carriers 70 can then be applied in the body of the tape 1, 2 in one plane, e.g. adjacent to each other, or one above the other.

Generally, and independent of any specific embodiment, it is not essential that there be a carrier 70 for supporting antennae 5, 11. Any number of individual antennae 5, 11 in any orientation may be arranged in the tape 1, 2 or on a surface of the tape 1, 2, in the absence of a carrier 70.

Whatever the arrangement of antennae 5, 11 in the tape 1, 2, it may be advantageous to arrange antennae 10, 11 at a minimum distance from each other, so that an antenna 5, 11 does not affect the radar reflection characteristics of an adjacent antenna 5, 11.

Figure 4:
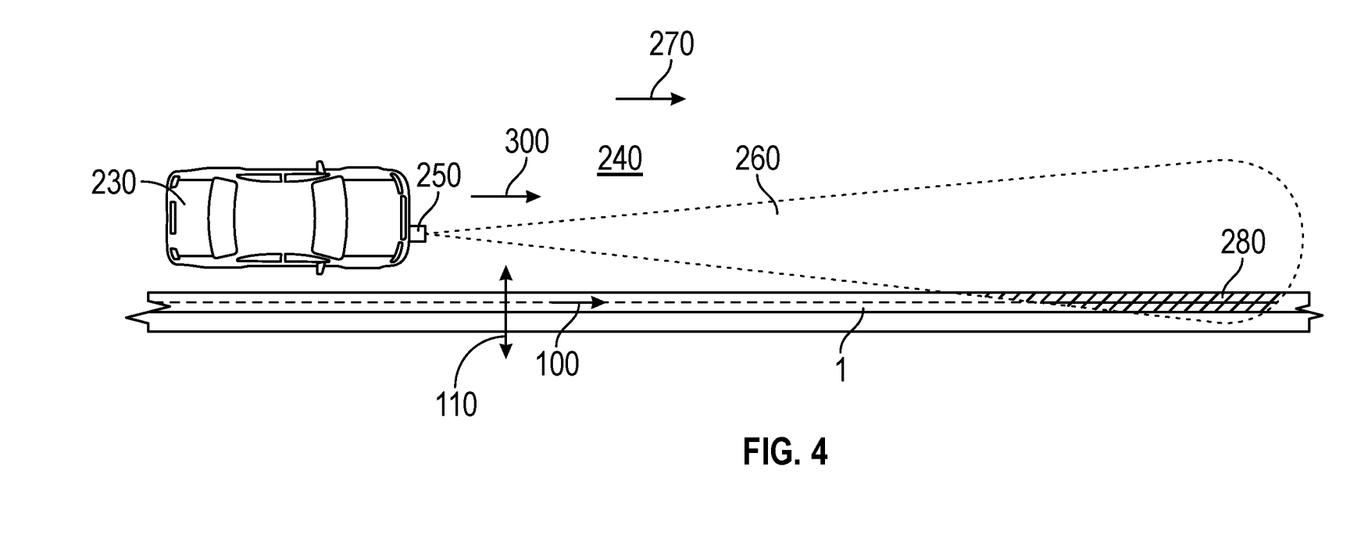
FIG. 4 Sketched top view of the tape of FIG. 2 applied on a road, and a vehicle driving on the road, showing emitted radar radiation.
Figure 5:
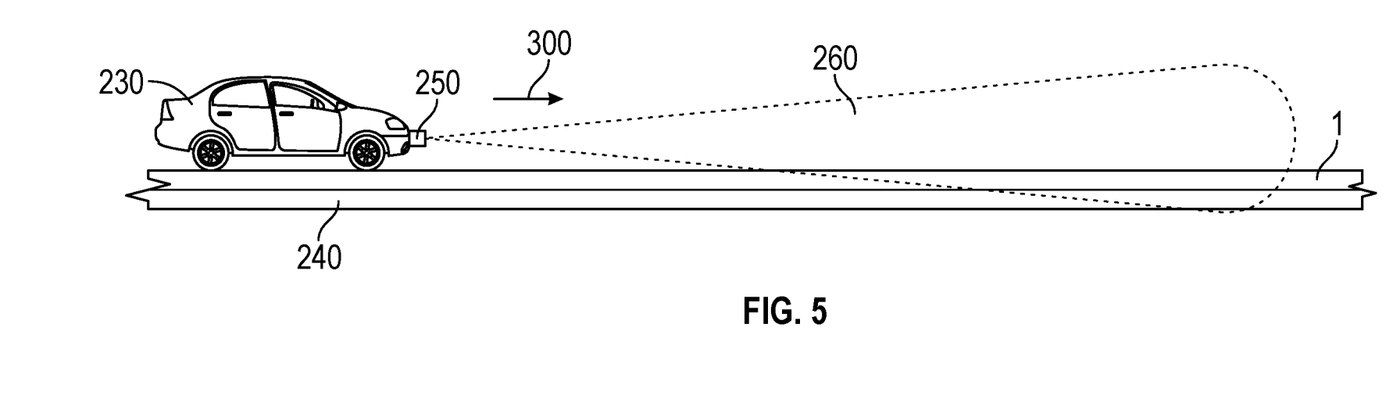
FIG. 5 Sketched side view of the scene of FIG. 4.

The radar redirecting tape 1, 2 of the present disclosure may be typically used for marking a road, so that the road marking facilitates guidance of autonomous vehicles on the road. In a useful geometry, the tape 1, 2 is applied on the road with its length direction 100 in a length direction of the road, i.e. in the driving direction of vehicles following the road. This geometry is shown in the sketches of FIGS. 4 and 5, where FIG. 4 shows, in top view, a vehicle 230 driving on a road 240 in a driving direction 300, i.e. towards the right in these Figures. A radar emitter 250, mounted on the vehicle 230, emits a radar beam 260 roughly in the driving direction 300. The lobe of the beam 260 indicates the angular intensity distribution of the radar beam 260.

The road 240 is laterally delimited by the radar-reflecting tape 1 shown in FIG. 2. The tape 1 is attached to the road such that its length direction 100 is aligned with, i.e. oriented parallel or antiparallel to, the driving direction 300 of the vehicle 230, which is essentially also the direction of the road 240, i.e. the "road direction" 270. The symmetry axes of the individual antennae of the tape 1 are thus aligned with, i.e. parallel to, the road direction 270. The tape 1 can be arranged such that the common reflection direction of the plurality of antennae is either parallel to the driving direction 300 and the road direction 270, or antiparallel thereto.

In FIG. 4, car 230 drives on the right-hand side of the road 240, and the tape 1 is applied on the right-hand side of the road 240. In this case, it is advantageous to orient the tape 1 such that the common reflection direction is antiparallel to the driving direction 300 of cars driving on the right-hand side of the road 240. This arrangement will provide a stronger reflection of the radar beam.

The radar beam 260 hits the tape 1 at a signal area 280 of the tape, which is at a distance of tens of meters in front of the vehicle 230. Obviously, the signal area 280 moves forward as the vehicle 230 drives, at about the speed of the vehicle. Advantageously, the radar emitter 250 is adjusted such that a maximum intensity of the radar beam 260 is irradiated on the tape 1 at a desired, possibly predetermined distance from the radar emitter 250. For a smooth guidance of a vehicle, it is generally desired that a radar looks some tens of meters, or a few hundreds of meters ahead of the vehicle. The scene of FIG. 4 is sketched FIG. 5 in a side view. The radar beam 260 is shown as emitted, not taking into account any reflections from the road surface or any distortions. The radar beam 260 may have an axially-symmetric intensity distribution, but the actual "shape" of the radar beam 260 is not essential.

Figure 6:
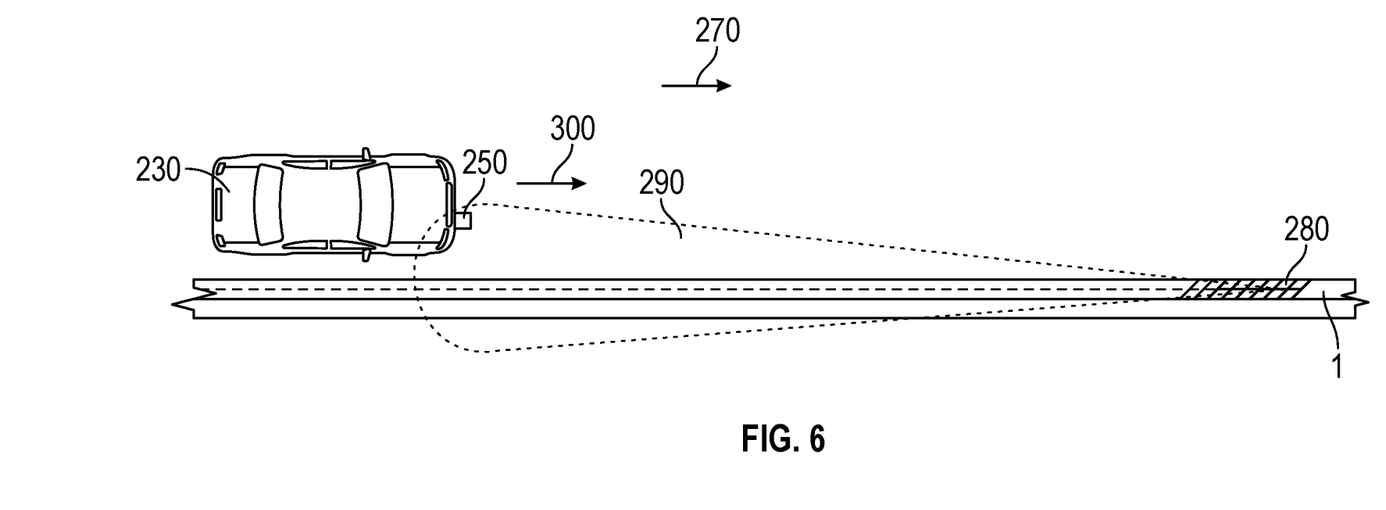
FIG. 6 Sketched top view of the scene of FIG. 4, showing reflected radar radiation.
Figure 7:
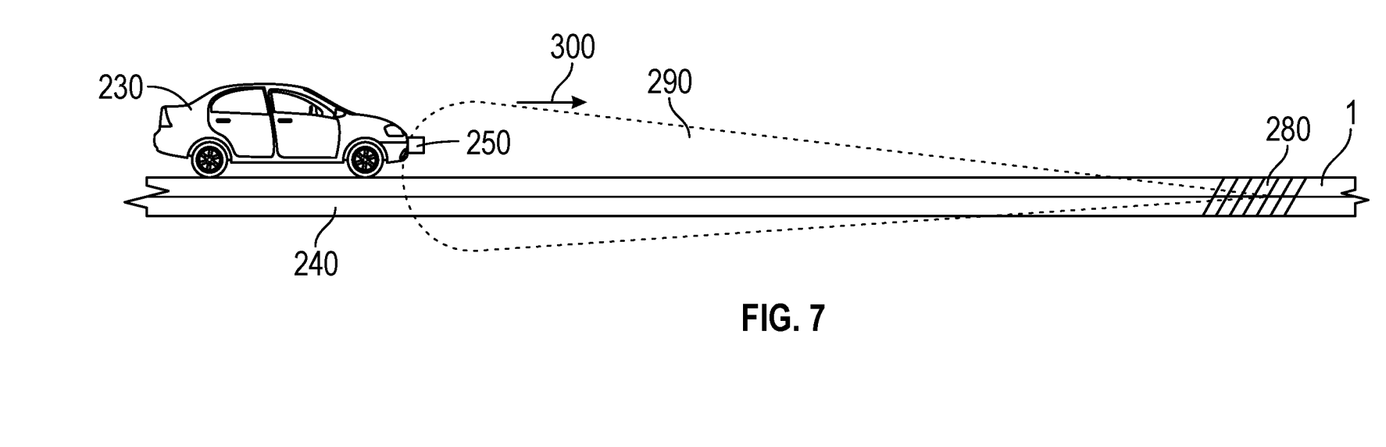
FIG. 7 Sketched side view of the scene of FIG. 6.

While FIGS. 4 and 5 show the radar beam 260 as emitted by the radar emitter 250, FIGS. 6 and 7 visualize, in top view and side view respectively, the scene of FIGS. 4 and 5, and the reflected radar radiation 290. Once a radar pulse of the radar beam 260 hits the signal area 280 of the tape 1, the radar radiation is picked up by the antennae of the tape 1 in the signal area 280. Since the reflection directions of the antennae are oriented antiparallel to the plane of the tape 1, a radar beam 260 arriving at a shallow angle is picked up with high efficiency, although not with the maximum possible efficiency.

The first antenna conductor, e.g., the dipole, of the antennae is electrically excited, and re-emits the radar pulse in the reflection direction. The angular intensity distribution of the reflected radar beam 290 is determined by the directional characteristics of the antennae. Although the predominant reflection direction of highest intensity of the reflected radiation 290 will generally be in the plane of the tape 1, and in length direction of the tape 1, the directional characteristics of the antennae may be adjusted such that a sufficient intensity of the reflected radar beam 290 is reflected towards the radar emitter 250 on the vehicle, where it is detected.

In some embodiments, the radar emitter 250 may be designed to also function as a radar detector. In some embodiments, one or more separate radar detectors may be used. In some embodiments, a second radar emitter may be sued operating at the same or a different frequency than the first radar emitter. The detected reflection signals may then be processed to provide additional information about the position of the vehicle relative to the tapes and the road.

Although Tape 1 is shown along the right hand side of the road, other locations are also useful including, e.g., the left hand side of the road, the center line of a lane, the boundary between lanes, or any combination thereof. Depending on the location of the tape, the predominant reflection directions of the various antenna areas may be adjusted.

For example, it may be desirable to include a first plurality having a first reflection direction and a second plurality having a second reflection direction which is antiparallel to the first reflection direction. With such tapes may be used by vehicles driving in either direction parallel to the length direction of the tape to reflect incident radar.

In some embodiments, it may be desirable to arrange antennae such that their reflection direction is not parallel to the length direction of the tape. For example, it may be desirable to adjust the reflection direction such that a greater reflection intensity is received by a vehicle some lateral distance from the tape.

Based on the present disclosure, one of ordinary skill in the art can design antennae and tapes for specific radar frequencies. For example for a tape that has a relative permittivity ($\varepsilon_R$) and a design radar frequency (F), wherein F is between (1 and 300 GHz (e.g., between 10 and 200

GHz) and $\varepsilon_R$ is greater than 1 and less than 10; the resulting effective wavelength ($\lambda'$) will be $c/(F\sqrt{\varepsilon_R})$, where c is the speed of light in a vacuum. Antennae may then be constructed wherein the length of the dipole is between 40 and 60% of the effective wavelength; the length of the first director is between 15 and 25% shorter than the length of the dipole; the distance between the dipole and the first director (d13) is between 15 and 25% of the length of the dipole; the length of the reflector is between 2 and 30% longer than the length of the dipole; the distance between the reflector and the dipole (d12) is between 25 and 35% of the length of the dipole; and the difference between d12 and d13 is between 5% and 30% of the length of the dipole.

Exemplary antennae are summarized in Table 1. For the 24 GHz examples, a relative permittivity ($\varepsilon_R$) of 2 and 6 is selected, while for 77 GHz, a relative permittivity ($\varepsilon_R$) of 4 and 8 is selected.

The dipole length is selected to be half the effective wavelength, with a range of +/-10%. The reflector length is selected to be 5% longer than the dipole (i.e., 105% of the dipole length) with a range of 102 to 108% of the dipole length. The distance between the dipole and the reflector (d12) is selected to be 30% of the dipole length with a range of 25 to 35%.

The director length is selected to be 20% shorter than the dipole (i.e., 80% of the dipole length) and ranging from 75 to 85% of the dipole length. The distance between the dipole and the director (d23) is selected to be 20% of the dipole length with a range of 15 to 25%. Note that for a distance d12 of 30% of the dipole length and a distance d23 of 20% of the dipole length the difference between d12 and d23 is 10% of the dipole length. Other selections may be made to achieve other differences in distance, e.g., at least 5%.

TABLE 1

Exemplary antennae.

| | | | Radar frequency | | | |
|---|---|---|---|---|---|---|
| | | | 24 GHz | | 77 GHz | |
| | | | Relative permittivity ($\varepsilon_R$) | | | |
| | | | 2 | 6 | 4 | 8 |
| | | | Effective wavelength (mm) | | | |
| | | | 8.84 | 5.10 | 1.95 | 1.38 |
| Dipole | Length | 50% | 4.42 | 2.55 | 0.97 | 0.69 |
| | (mm) | +/-10% | 3.98-4.86 | 2.30-2.81 | 0.88-1.07 | 0.62-0.76 |
| Director | Length | 80% | 3.54 | 2.04 | 0.78 | 0.55 |
| | (mm) | 75-85% | 3.31-3.76 | 1.91-2.17 | 0.73-0.83 | 0.52-0.59 |
| | d13 | 20% | 0.88 | 0.51 | 0.19 | 0.14 |
| | (mm) | 15-25% | 0.66-1.10 | 0.38-0.64 | 0.15-0.24 | 0.10-0.17 |
| Reflector | Length | 105% | 4.64 | 2.68 | 1.02 | 0.72 |
| | (mm) | 102-108% | 4.51-4.77 | 2.60-2.76 | 0.99-1.05 | 0.70-0.74 |
| | d12 | 30% | 1.33 | 0.77 | 0.29 | 0.21 |
| | (mm) | 25-35% | 1.10-1.55 | 0.64-0.89 | 0.24-0.34 | 0.17-0.24 |

These antennae merely illustrate the use of the various design considerations describe herein, and one of ordinary skill in the art could make other selections based on teachings of this disclosure. For example, although radar frequencies of 1 to 300 GHz are possible, antennae designs for only 24 GHz and 77 GHz are shown.

Generally, the calculated dimensions will provide good performance acceptable for many applications. However, these values also provide an excellent starting point for a limited amount of routine experimentation, which may lead to better performance.

The invention claimed is:

1. A radar-radiation redirecting tape, arrangeable such as to define a plane, the tape comprising:
 a first plurality of individual radar-reflecting directional antennae,
 wherein each directional antenna comprises at least three elongate, antenna conductors, arranged with their long extensions parallel to each other in the plane of the tape, such that the directional antenna is operable to redirect incoming radar radiation predominantly in a direction which is orthogonal to the long extension of the antenna conductors and parallel to the plane of the tape,
 wherein a first antenna conductor is a dipole, a second antenna conductor is a reflector, and a third antenna conductor is a first director;
 wherein the dipole is arranged between the reflector and the first director;
 wherein the distance between the dipole and the adjacent reflector is different from the distance between the dipole and the adjacent first director,
 wherein the tape has a relative permittivity ($\varepsilon_R$) and a design radar frequency (F), wherein F is between 10 and 200 GHz and $\varepsilon_R$ is greater than 1 and less than 10; resulting in an effective wavelength ($\lambda'$) of $c/(F\sqrt{\varepsilon_R})$, where c is the speed of light in a vacuum; wherein:
  the length of the dipole is between 40 and 60% of the effective wavelength,
  the length of the first director is between 15 and 25% shorter than the length of the dipole;
  the distance between the dipole and the first director d13 is between 15 and 25% of the length of the dipole;
  the length of the reflector is between 2 and 30% longer than the length of the dipole;
  the distance between the reflector and the dipole d12 is between 25 and 35% of the length of the dipole; and
  the difference between d12 and d13 is between 5% and 30% of the length of the dipole.

2. The tape according to claim 1, wherein the dipole has a length of between 0.15 millimeters and 15 centimeters.

3. The tape according to claim 2, wherein the dipole has a length of between 0.2 millimeters and 20 millimeters.

4. The tape according to claim 1, wherein the first director is spaced from the dipole by a distance d13 of between 10 and 30% of the length of the dipole.

5. The tape according to claim 1, wherein the reflector is spaced from the dipole by a distance d12 of between 20 and 40% of the length of the dipole.

6. The tape according to claim 1, wherein the difference between the distance d13 and the distance d12 is between 5% and 30% of the length of the dipole.

7. The tape according to claim 1, wherein the length of the first director is at least 10% shorter than the length of the dipole.

8. The tape according to claim 7, wherein the length of the first director (30) is 10 to 30% shorter than the length of the dipole (10).

9. The tape according to claim 1, wherein the length of the reflector is at least 2% longer than the length of the dipole.

10. The tape according to claim 9, wherein the length of the reflector (20) is between 2 and 8% greater than the length of the dipole (30).

11. The tape according to claim 1, wherein the at least three elongate, unevenly spaced antenna conductors, arranged with their long extensions parallel to each other in the plane of the tape, are arranged and adapted such that they form a Yagi-type antenna structure.

12. The tape according to any claim 1, wherein the tape is elongate and defines, in the plane of the tape, a length direction and a width direction orthogonal thereto, and wherein the antenna conductors of the first plurality of antennae are arranged, in the plane of the tape, such that their long extensions are orthogonal to the length direction of the tape.

13. The tape according to claim 1, further comprising a carrier supporting one or more of the antenna conductors of the first plurality of antennae.

14. The tape according to claim 1, wherein all antennae of the first plurality of individual radar-reflecting directional antennae have the same geometric orientation in the plane of the tape, for providing a first common predominant reflection direction of the first plurality of individual radar-reflecting directional antennae.

15. A radar-radiation redirecting tape, arrangeable such as to define a plane, the tape comprising:

a first plurality of individual radar-reflecting directional antennae, wherein each directional antenna comprises at least three elongate, antenna conductors, arranged with their long extensions parallel to each other in the plane of the tape, such that the directional antenna is operable to redirect incoming radar radiation predominantly in a direction which is orthogonal to the long extension of the antenna conductors and parallel to the plane of the tape, wherein a first antenna conductor is a dipole, a second antenna conductor is a reflector, and a third antenna conductor is a first director;

wherein the dipole is arranged between the reflector and the first director;

wherein the distance between the dipole and the adjacent reflector is different from the distance between the dipole and the adjacent first director, further comprising a second plurality of individual radar-reflecting directional antennae, wherein each directional antenna of the second plurality of antennae comprises at least three elongate, unevenly spaced antenna conductors, arranged with their long extensions parallel to each other in the plane of the tape, wherein all antennae of the second plurality of individual radar-reflecting directional antennae have the same geometric orientation in the plane of the tape, for providing a second common predominant reflection direction of the second plurality of individual radar-reflecting directional antennae, wherein the angle between the first common predominant reflection direction and the second common predominant reflection direction is between 1 and 180 degrees.

16. The tape according to claim 15, wherein the antenna conductors of the antennae of the first and of the second plurality of antennae are formed on the same carrier.

17. The tape according to claim 1, further comprising a plurality of visibly retroreflective elements on a first major surface of the tape, and an adhesive on a second major surface of the tape.

* * * * *

UNITED STATES PATENT AND TRADEMARK OFFICE
CERTIFICATE OF CORRECTION

PATENT NO. : 11,163,054 B2
APPLICATION NO. : 16/321376
DATED : November 2, 2021
INVENTOR(S) : Christian Weinmann et al.

It is certified that error appears in the above-identified patent and that said Letters Patent is hereby corrected as shown below:

In the Claims

Column 20

Line 25 (approx.), in Claim 1, delete "less than 10;" and insert -- less than 10, --, therefor.

Line 27 (approx.), in Claim 1, delete "in a vacuum;" and insert -- in a vacuum, --, therefor.

Line 29 (approx.), in Claim 1, delete "wavelength," and insert -- wavelength; --, therefor.

Column 21

Line 14, in Claim 8, delete "the director (30)" and insert -- the director --, therefor.

Line 15, in Claim 8, delete "the dipole (10)" and insert -- the dipole --, therefor.

Line 19, in Claim 10, delete "reflector (20)" and insert -- reflector --, therefor.

Line 20, in Claim 10, delete "the dipole (30)" and insert -- the dipole --, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*